Jan. 17, 1961    P. W. CRAPUCHETTES    2,968,039
APPARATUS FOR JOINING WORKPIECE ELEMENTS
Filed Oct. 29, 1958    2 Sheets-Sheet 1

INVENTOR,
PAUL W. CRAPUCHETTES.
BY
Harry M. Saragovitz
ATTORNEY

Jan. 17, 1961 P. W. CRAPUCHETTES 2,968,039
APPARATUS FOR JOINING WORKPIECE ELEMENTS
Filed Oct. 29, 1958 2 Sheets-Sheet 2
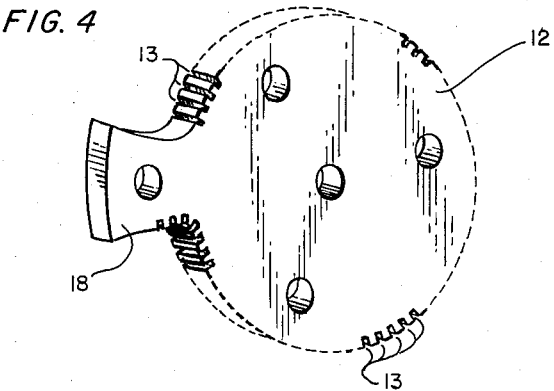
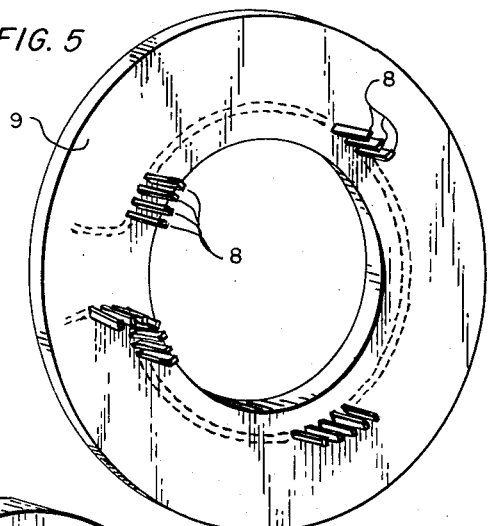
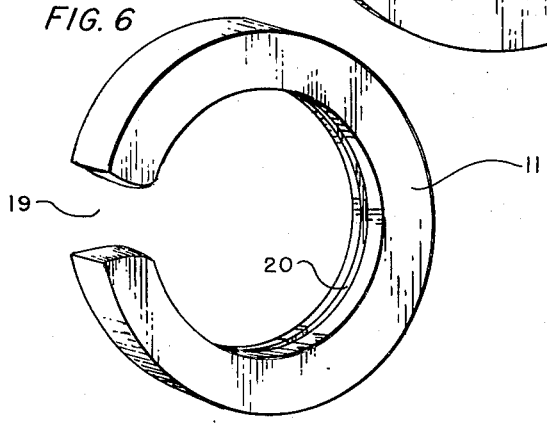
INVENTOR,
PAUL W. CRAPUCHETTES.
BY
*Harry M. Saragovitz*
ATTORNEY.

United States Patent Office 2,968,039
Patented Jan. 17, 1961

2,968,039

APPARATUS FOR JOINING WORKPIECE ELEMENTS

Paul W. Crapuchettes, Atherton, Calif., assignor to the United States of America as represented by the Secretary of the Army Filed Oct. 29, 1958, Ser. No. 770,569

5 Claims. (Cl. 1—1)

This invention relates to a method and means for fabricating metallic structures and particularly to precision structures subject to thermal and mechanical destructive forces.

The invention is useful in constructing a wide variety of devices wherein close tolerances must be met and wherein the tolerances must hold over a long period of use under severe mechanical, thermal or a combination of mechanical and thermal forces.

In the field of electronic component design and construction the invention is especially useful. By way of example, therefore, the inventive principles will be presented in connection with the structure of a backward wave oscillator tube such as the carcinotron. In this tube a delay line must be made in which the spaced fingers of an interdigital structure must be positioned to very close tolerances. This precision must be maintained despite severe thermal distortion tendencies.

It has been the practice heretofore to machine such component parts from solid metallic blocks. Such techniques are costly and fail to lend themselves to quantity production. Moreover, as will appear hereinafter for certain specialized purposes it is highly advantageous to fabricate such parts as above referred to from a combination of different materials such as copper and tungsten. In such case the practice of machining from a solid block is eliminated and brazing or other combining techniques are resorted to. To hold tolerances in such known procedures is very difficult not only during fabrication but the union many times is mechanically and thermally unstable. In such structures if minimum electrical impedance is essential brazing may not be consistently effective.

The invention provides a technique which insures a high degree of precision and stability in the devices fabricated, and its basic operation is that of forceful driving of one element into that of another wherein a cold flow in the material of one element occurs to permit the entrance of the other element. It will be evident that such an operation requires high assembling pressures which tend to distort or crush the members assembled.

The invention provides a guiding and holding device which functions to prevent distortion of the driven member or members during the assembling operation. In the embodiment to be described in detail hereinafter the workpiece assembled is one member of an interdigital delay line such as used in a carcinotron tube. In this workpiece a plurality of equally spaced fingers are mounted on a supporting plate. The invention provides a rapid and highly precise means for assembling the fingers on their supporting plate.

Briefly, the invention consists of an assembly of coacting guiding and driving elements similar to a die assembly. This assembly is driven by a suitable hydraulic press or other high pressure device. The assembly is provided with a finger holding plate in which the fingers to be driven are held in open-sided slots along the periphery thereof with their bottom ends engaging the support into which they are driven. A ram above the pins guided in a hollow cylinder is driven by the press to force the pins into their support.

The invention is particularly directed to a novel means for rigidly holding the fingers against lateral movement, and preventing crushing or distortion thereof during the driving operation. Such means includes the slotted pin holding plate and a member fitted in the hollow cylinder and bearing against the row of fingers in their slots. This inserted member is made of a material which has some slight flow property under high pressure such as hard rubber. The inserted member is engaged by the driving ram while the pins are driven and thus exerts an intense lateral pressure against the pins which are thus rigidly held against lateral deformation. The slightly yielding nature of the inserted member is such that the pins are not locked but are permitted to move downward under the ram pressure to enter the supporting plate. The high lateral force acting on the fingers insures that the pins will remain straight and precisely perpendicular and that their position in the support is accurate.

It is a primary object of the invention to provide means for joining a plurality of separate members to form a permanent unitary structure having maximum stability, rigidity and high placement precision.

A further object of the invention is to provide an assembling fixture for accurately holding and protecting the parts to be joined while they are being assembled.

A further object of the invention is to provide means for accurately joining a plurality of separate metallic members in a cold flow penetrating assembly operation.

A further object of the invention is to provide means for joining metallic parts by penetration of one within the other and protecting the driven part from breakdown or distortion during the assembling operation.

Other objects and features of the invention will more fully appear from the following description and will be particularly pointed out in the claims.

To provide a better understanding of the invention a particular embodiment thereof will be described and illustrated in the accompanying drawing, in which:

Fig. 4 illustrates a holding device and guide for the driven elements of the workpiece.

Fig. 5 is a perspective view of the workpiece showing some of the driven elements assembled to a supporting plate.

Fig. 6 is a perspective view of an elastic ring which acts as a guiding and supporting means for the driven members of the workpiece.

Figure 1:
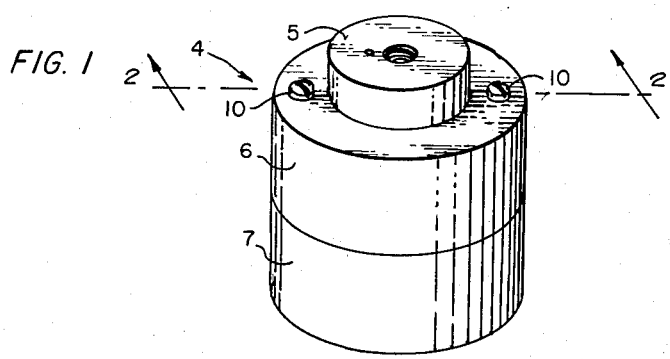
Fig. 1 is a general view in perspective of the apparatus.

Fig. 1 of the drawings shows the general external appearance of the complete assembly 4 wherein 5 is a ram which transmits motion to the workpiece elements to accomplish the assembling operation. The ram moves within an upper body member 6 which is secured to a lower body 7. The whole assembly is placed between the platens of a hydraulic press, not shown, or other high pressure device from which the power to perform the assembling operation is derived.

Figure 2:
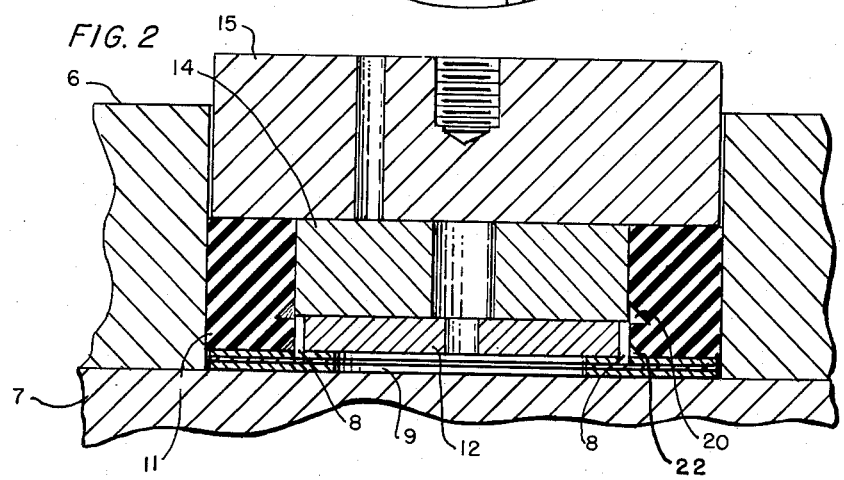
Fig. 2 is a partial cross-section on line 2—2 Fig. 1.
Figure 3:
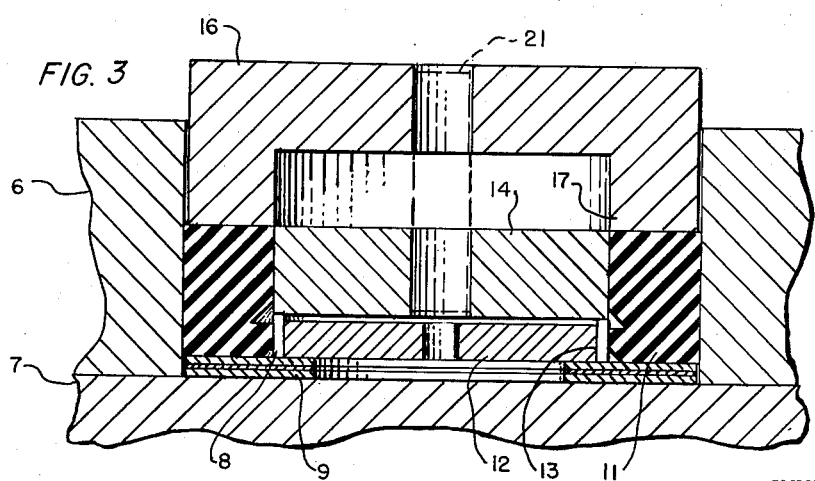
Fig. 3 is a partial cross-section of the apparatus showing the manner of accomplishing a preliminary positioning step of the driven elements of the workpiece.

Referring to Fig. 2 the essential elements of the apparatus and their relative positions are shown. As above pointed out, the specific structure shown in the drawings is devised to assemble the fingers 8 upon their supporting plate 9 commonly referred to as a crown plate which is one portion of an interdigital type delay line for an M type backward wave oscillator; the other portion of the line being of similar construction. The two portions are secured in position in the tube with the fingers thereof in interleaved relation to constitute the delay line.

The crown plate 9 may desirably be of multilayer construction. As shown the top and bottom layers are copper with a layer of constantan sandwiched therebetween. The constantan thermally stabilizes and adds rigidity to the plate 9.

To assemble the apparatus the plate 9 is placed within the body member 6 which is a hollow cylinder and rests upon the surface of the lower body member 7 which is made of hardened steel and has a flat smooth upper face. The upper body portion 6 is of unhardened steel and is fastened to the lower portion in any suitable manner such as by the screws 10. The upper section 6 constitutes the cylindrical wall of the assembly. Within the cylinder 6 and resting upon the plate 9 is a ring 11 of material which is elastic under high pressure and slightly fluid in character. Such a material may be hard rubber or certain types of plastic. Within the ring 11 is received a positioning and guiding plate 12, preferably of hardened steel, which serves to hold and guide the fingers 8 while they are driven. The structure of the positioning plate 12 is shown in Fig. 4. The plate is shaped to conform to the desired contour of the delay line and is provided with a plurality of vertical slots 13 to receive the fingers. The slots open outwardly and expose the fingers to lateral engagement by the resilient ring 11. The thickness of the plate 12 is adjusted to be less than the length of the fingers by an amount substantially equal to the penetration of the fingers into the plate 9. A finger pressure plate 14, preferably of hardened steel, is placed in position within the ring 11 in contact with the fingers and extending to a height slightly less than the top face of the ring. On top of the ring and the plate 14 and within the cylinder 6 is placed a pressure transmitting member 15 projecting above the body member 6 and engaged by the press platen not shown. The members 14 and 15 constitute a ram by which the assembling pressure is transmitted to the workpiece.

The above assembly is that used in the actual pressing operation which drives the fingers into their supporting plate 9. The apparatus of the invention is capable of maintaining close tolerances consistently in a large number of finished workpieces and to insure this precision a preliminary finger positioning step is desirable. To execute this positioning step a hardened steel pressure transmitting member 16 of special construction is inserted in place of the member 15. The member 16 has a cylindrical skirt section 17 formed by recessing its center portion. The bottom face of the skirt 17 has the same configuration as the top face of the ring 11 with which it mates when inserted in the body member 6.

With the member 16 in place the assembly is placed in the press and pressure is applied. At this time, however, pressure is confined to the ring 11 which expands laterally producing a lateral force upon the fingers which are moved into their proper position as determined by the slots in the plate 12. The member 16 is then removed and the member 15 put in place in the body portion 6. Pressure is again applied and this time the pressure plate 14 is forced against the upper end of the fingers which are caused to penetrate the supporting plate 9.

The plate 9 is made of copper or other mildly hard metal and the fingers are of a harder metal. For the workpiece herein described the fingers are made of tungsten. It should be pointed out in this connection that the use of tungsten is highly desirable in electronic devices such as the carcinotron type tube above suggested. Since this metal is very stable under thermal stresses the resulting product will maintain its initial precision over a long time period.

For best operation of the invention the top plane of the finger pressing plate 14 should be slightly below the top plane of ring 11. The pressure plate 15 thus first rests upon the ring 11 and as it descends under the power of the press the ring impresses a high intensity lateral supporting pressure upon the fingers. The plate 14 then forces the fingers into the support member 9 at which time a cold flow of metal takes place in the member 9 while the fingers penetrate to their final position at which time the plate 14 engages the finger positioning plate 12. The degree of penetration, however, may be adjusted in other ways such as by limiting the travel of the ram of the pressing device. The resulting joint between the fingers and their supporting plate is extremely rigid and in addition the relative placement of the fingers is precise since it is entirely determined by the slots in the plate 12.

Throughout the driving of the fingers the ring 11 maintains its lateral pressure on the fingers. The intensity of this pressure is such that the fingers are prevented from distorting under the driving pressure of the actuating press and due to the resilient nature of the pressure the pins are not locked against vertical movement. Vertical driving of the fingers is thus accomplished. The apparatus is then taken apart and the workpiece is removed. Another set of fingers is then placed in the plate 12, the parts again assembled and the pressing operation repeated.

The material out of which the ring 11 is made must have somewhat unusual characteristics. It must be elastic so that it will return to its original conformation. It must have a slight degree of fluidity to insure that the fingers 8 will be moved into correct position when pressure is applied but the fluidity must not be such that the material will flow too readily as in the case of a true liquid. Certain classes of rubber commonly designated as hard rubber have been found suitable but other materials such as plastics having the required characteristics may be used.

It has been found that the technique of operation of the apparatus is readily adapted to mass production. The speed of production of workpieces, over prior techniques, is greatly increased. Moreover, the component parts of the apparatus may readily be made in quantity with tolerances held to close limits, thus permitting low cost replacement of worn parts and interchangeability of parts from one assembly to another.

It will be noted from Figs. 4 and 5 that the delay line of which the workpiece is a part has an irregular shape which requires that the plate 12 be provided with a neck portion 18. The ring 11 must, therefore, be cut away as shown at 19 in Fig. 6 to enable the parts to be assembled. If necessary, suitable apertures not shown should be provided to allow escape of trapped air during the pressing operation.

If found necessary or desirable the resilient ring 11 may be somewhat modified to better control the application of lateral pressure to the pins. As shown in Fig. 2 the ring 11 is internally annularly grooved at 20. The height of the groove extends vertically from a point slightly below the upper face of the plate 12 to a point above the top of the fingers before they are driven. This relieves lateral pressure from the unsupported upper ends of the fingers.

A portion of the bottom inner edge of the ring 11 may also be removed to prevent undesirable flow of the rubber at that point.

What is claimed is:

1. In combination with a pressing device an apparatus for assembling workpiece parts by a cold penetration operation comprising a hollow rigid metallic body to contain a first workpiece element, a holding and guiding element containing a group of second workpiece elements to be driven into said first workpiece element, a lateral pressure member having limited elasticity and fluidity under high pressure inserted between and laterally engaging both the wall of said body and at least a portion of the surface of said second workpiece elements and a pressure transferring member above and contacting with the upper vertical extremity of said second workpiece elements and the upper face of said lateral pressure element whereby force exerted by said press thereon will drive the second workpiece elements into the first workpiece element while the lateral pressure member exerts an intense lateral stabilizing pressure upon said second workpiece elements.

2. An apparatus for assembling workpiece elements by a cold penetrating operation according to claim 1 wherein the second workpiece element holding and guiding member is a plate less in thickness than the height of the workpiece elements and having a plurality of outwardly opening recesses in its periphery said recesses being accurately dimensioned and positioned to receive and vertically guide said elements in conjunction with said pressure member while they are driven.

3. An apparatus for assembling workpiece elements according to claim 1 and a groove formed in said pressure member adjacent the upper ends of said second workpiece elements.

4. In combination with a pressing device an apparatus for assembling parts by a cold penetration operation comprising a rigid hollow body adapted to receive a first workpiece element, a holding and guiding member in said body above and engaging the first workpiece element and having a plurality of laterally opening recesses therein, said recesses being adapted to receive an array of second workpiece elements having vertical movement therein and projecting a short distance above the holding device, a lateral pressure member having limited elasticity and fluidity under high pressure inserted in said body between its inner side wall and the peripheral face of said holding and guiding member, a ram engaging the upper ends of said second workpiece elements and said lateral pressure member whereby pressure applied to the ram will drive the second workpiece elements into the first workpiece element and simultaneously apply intense lateral pressure upon the second workpiece elements.

5. In combination with a pressing means an apparatus for assembling workpiece elements for a cold flow penetration operation comprising a rigid hollow body structure adapted to receive a first workpiece element a holding and guiding element in said body above said first workpiece element adapted to receive and guide a group of second workpiece elements in driving position on the said first workpiece element with a portion of said second workpiece elements uncovered, a lateral pressure member of annular conformation having limited elasticity and fluidity under high pressure in said body between said holding and guiding means and the inner wall of said body and engaging the uncovered portion of said second workpiece elements, a ram for laterally positioning said second workpiece elements having its bottom face shaped to conform to and engaging only the upper face of said lateral pressure member, a rigid filler member engaging the upper ends of said second workpiece elements and received within and closely embraced by the upper portion of said lateral pressure member, operable to prevent lateral expansion of said lateral pressure member at its area of engagement therewith, whereby when said ram is driven downward lateral pressure is applied to said second workpiece elements to accurately position them in said holding and guiding member.

References Cited in the file of this patent
UNITED STATES PATENTS

| | | |
|---|---|---|
| 1,642,165 | McCaffrey | Sept. 13, 1927 |
| 2,740,192 | Ogle | Apr. 3, 1956 |
| 2,818,567 | Oliver | Jan. 7, 1958 |
| 2,834,016 | Stedler | May 13, 1958 |